United States Patent
Stanley et al.

(10) Patent No.: US 10,795,160 B1
(45) Date of Patent: Oct. 6, 2020

(54) SYSTEMS FOR AND METHODS OF USING FOLD GRATINGS FOR DUAL AXIS EXPANSION

(71) Applicants: Rockwell Collins, Inc., Cedar Rapids, IA (US); DIGILENS INC., Sunnyvale, CA (US)

(72) Inventors: James H. Stanley, Palo Alto, CA (US); Jonathan David Waldern, Los Altos Hills, CA (US); Milan Momcilo Popovich, Leicester (GB); Alastair John Grant, San Jose, CA (US); Steven J. Robbins, San Jose, CA (US)

(73) Assignees: Rockwell Collins, Inc., Cedar Rapids, IA (US); Digilens Inc., Sunnyvale, CA (US)

( * ) Notice: Subject to any disclaimer, the term of this patent is extended or adjusted under 35 U.S.C. 154(b) by 0 days.

(21) Appl. No.: 14/497,280

(22) Filed: Sep. 25, 2014

(51) Int. Cl.
| | | |
|---|---|---|
| G02B 27/01 | (2006.01) | |
| G02B 5/18 | (2006.01) | |
| G02B 27/10 | (2006.01) | |

(52) U.S. Cl.
CPC ....... *G02B 27/0172* (2013.01); *G02B 5/1828* (2013.01); *G02B 5/1842* (2013.01);
(Continued)

(58) Field of Classification Search
CPC ...... G02B 5/1814–1828; G02B 5/1842; G02B 26/0808; G02B 27/01–0103;
(Continued)

(56) References Cited

U.S. PATENT DOCUMENTS

| | | |
|---|---|---|
| 2,141,884 A | 12/1938 | Sonnefeld |
| 3,620,601 A | 11/1971 | Waghorn |

(Continued)

FOREIGN PATENT DOCUMENTS

| | | |
|---|---|---|
| CN | 200944140 Y | 9/2007 |
| CN | 101151562 A | 3/2008 |

(Continued)

OTHER PUBLICATIONS

Final Office Action on U.S. Appl. No. 13/869,866 dated Oct. 3, 2014, 17 pages.
(Continued)

*Primary Examiner* — Kimberly N. Kakalec
(74) *Attorney, Agent, or Firm* — Donna P. Suchy

(57) ABSTRACT

A near eye optical display includes a waveguide comprising a first surface and a second surface, an input coupler, a fold grating, and an output grating. The input coupler is configured to receive collimated light from a display source and to cause the light to travel within the waveguide via total internal reflection between the first surface and the second surface to the fold grating; the fold grating is configured to provide pupil expansion in a first direction and to direct the light to the output grating via total internal reflection between the first surface and the second surface; and the output grating is configured to provide pupil expansion in a second direction different than the first direction and to cause the light to exit the waveguide from the first surface or the second surface.

20 Claims, 3 Drawing Sheets

(52) U.S. Cl.
CPC .. *G02B 27/1066* (2013.01); *G02B 2027/0123* (2013.01); *G02B 2027/0147* (2013.01); *G02B 2027/0178* (2013.01)

(58) Field of Classification Search
CPC . G02B 27/017–0172; G02B 2027/0105–0107; G02B 2027/0123–0125; G02B 2027/0132–0136; G02B 2027/014; G02B 2027/0147; G02B 2027/0174; G02B 2027/0178; G02B 27/106–1066; G02B 27/1086–1093; G02B 27/4272; G02F 1/11; G02F 1/125; G02F 1/1323; G02F 1/292; G02F 1/31; G02F 1/313; G02F 1/33–335; G02F 2201/307
USPC ..... 359/13–15, 34, 320, 566, 569, 572, 573, 359/575, 576, 630–633; 345/7–9; 385/10, 37, 129–131; 353/28, 39
See application file for complete search history.

(56) References Cited

U.S. PATENT DOCUMENTS

| | | |
|---|---|---|
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,799,765 A | 1/1989 | Ferrer |
| 4,854,688 A | 8/1989 | Hayford et al. |
| 4,860,294 A | 8/1989 | Winzer et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,306,923 A | 4/1994 | Kazmierski et al. |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,680,411 A | 10/1997 | Ramdane et al. |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,867,618 A | 2/1999 | Ito et al. |
| 5,868,951 A | 2/1999 | Schuck et al. |
| 5,886,822 A | 3/1999 | Spitzer |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,156,243 A | 12/2000 | Kosuga et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |

(56) References Cited

U.S. PATENT DOCUMENTS

| | | |
|---|---|---|
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,317,528 B1 | 11/2001 | Gadkaree et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,522,795 B1 | 2/2003 | Jordan et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,560,019 B2 | 5/2003 | Nakai |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,624,943 B2 | 9/2003 | Nakai et al. |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B2 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,075 B2 | 2/2006 | Miyake et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,376,307 B2 | 5/2008 | Singh et al. |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,587,110 B2 | 9/2009 | Singh et al. |
| 7,588,863 B2 | 9/2009 | Takizawa et al. |
| 7,589,900 B1 | 9/2009 | Powell |

(56) References Cited

U.S. PATENT DOCUMENTS

| | | |
|---|---|---|
| 7,589,901 B2 | 9/2009 | Dejong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1 | 5/2013 | Imanuel |
| 8,472,119 B1 | 6/2013 | Kelly |
| 8,472,120 B2 | 6/2013 | Border et al. |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,749,890 B1 | 6/2014 | Wood et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1 | 9/2014 | Brown et al. |
| 8,903,207 B1 | 12/2014 | Brown et al. |
| 8,913,324 B2 | 12/2014 | Schrader |
| 8,937,772 B1 | 1/2015 | Burns et al. |
| 8,938,141 B2 | 1/2015 | Magnusson |
| 8,964,298 B2 | 2/2015 | Haddick et al. |
| 9,097,890 B2 | 8/2015 | Miller et al. |
| 9,244,280 B1 | 1/2016 | Tiana et al. |
| 9,341,846 B2 | 5/2016 | Popovich et al. |
| 9,366,864 B1 | 6/2016 | Brown et al. |
| 9,456,744 B2 | 10/2016 | Popovich et al. |
| 9,523,852 B1 | 12/2016 | Brown et al. |
| 9,632,226 B2 | 4/2017 | Waldern et al. |
| 9,933,684 B2 | 4/2018 | Brown et al. |
| 2001/0036012 A1 | 11/2001 | Nakai et al. |
| 2002/0012064 A1 | 1/2002 | Yamaguchi |
| 2002/0021461 A1 | 2/2002 | Ono et al. |
| 2002/0127497 A1 | 9/2002 | Brown et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0047938 A1 | 3/2004 | Kosuga et al. |
| 2004/0075830 A1 | 4/2004 | Miyake et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |

(56) References Cited

U.S. PATENT DOCUMENTS

| | | |
|---|---|---|
| 2005/0259302 A9 | 11/2005 | Metz et al. |
| 2005/0269481 A1 | 12/2005 | David et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0215244 A1 | 9/2006 | Yosha et al. |
| 2006/0215976 A1 | 9/2006 | Singh et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0193085 A1 | 8/2008 | Singh et al. |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284180 A1 | 11/2010 | Popovich et al. |
| 2010/0296163 A1 | 11/2010 | Saarikko |
| 2010/0315719 A1 | 12/2010 | Saarikko |
| 2010/0321781 A1 | 12/2010 | Levola et al. |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0093893 A1 | 4/2013 | Schofield et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1 | 7/2013 | Gadzinski |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1 | 2/2014 | Mason |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1* | 10/2014 | Travers .............. G02B 27/4205 359/558 |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0178901 A1 | 6/2016 | Ishikawa |

(56) References Cited

U.S. PATENT DOCUMENTS

| | | |
|---|---|---|
| 2016/0209657 A1 | 7/2016 | Popovich et al. |
| 2016/0238772 A1 | 8/2016 | Waldern et al. |
| 2016/0274356 A1 | 9/2016 | Mason |
| 2016/0291328 A1 | 10/2016 | Popovich et al. |
| 2017/0031160 A1 | 2/2017 | Popovich et al. |
| 2018/0052277 A1 | 2/2018 | Schowengerdt et al. |
| 2018/0284440 A1 | 10/2018 | Popovich et al. |
| 2018/0373115 A1 | 12/2018 | Brown et al. |
| 2019/0121027 A1 | 4/2019 | Popovich et al. |
| 2019/0212699 A1 | 7/2019 | Waldern et al. |
| 2019/0319426 A1 | 10/2019 | Lu et al. |
| 2020/0026074 A1 | 1/2020 | Waldern et al. |

FOREIGN PATENT DOCUMENTS

| | | |
|---|---|---|
| CN | 101263412 A | 9/2008 |
| CN | 101589326 | 11/2009 |
| CN | 101688977 A | 3/2010 |
| CN | 101726857 A | 6/2010 |
| CN | 101881936 A | 11/2010 |
| CN | 101910900 A | 12/2010 |
| CN | 102608762 A | 7/2012 |
| CN | 104520751 A | 4/2015 |
| DE | 1020060 03 785 | 7/2007 |
| EP | 0 822 441 | 2/1998 |
| EP | 2 110 701 | 10/2009 |
| EP | 2 196 729 | 6/2010 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2002-529790 A | 9/2002 |
| JP | 2002-311379 | 10/2002 |
| JP | 2004-157245 | 6/2004 |
| JP | 2006-350129 A | 12/2006 |
| JP | 2007-011057 A | 1/2007 |
| JP | 2007-094175 | 4/2007 |
| JP | 2007-219106 A | 8/2007 |
| JP | 2009-133999 A | 6/2009 |
| JP | 2010-256631 | 11/2010 |
| JP | 2016-030503 | 3/2016 |
| WO | WO-99/52002 | 10/1999 |
| WO | WO-00/28369 A2 | 5/2000 |
| WO | WO-03/081320 A1 | 10/2003 |
| WO | WO-2006/002870 | 1/2006 |
| WO | WO-2007/130130 A2 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |
| WO | WO-2016/044193 | 3/2016 |

OTHER PUBLICATIONS

Final Office Action on U.S. Appl. No. 14/038,400 dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 dated Jul. 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 dated Jul. 14, 2015, 32 pages.
Non-Final Office Action on U.S. Appl. No. 14/168,173 dated Jun. 22, 2015, 14 pages.
Notice of Allowance on U.S. Appl. No. 13/355,360 dated Apr. 10, 2014, 7 pages.
Office Action, U.S. Appl. No. 10/696,507, dated Nov. 13, 2008 (CTX-290US), 15 pages.
Restriction Requirement for U.S. Appl. No. 12/700,557, dated Oct. 17, 2012, 5 pages.
U.S. Appl. No. 61/344,748, filed Sep. 28, 2010.
U.S. Appl. No. 61/457,835, filed Jun. 16, 2011.
U.S. Appl. No. 61/573,066, filed Aug. 24, 2012.
U.S. Appl. No. 61/573,082, filed Aug. 29, 2011.
U.S. Appl. No. 61/573,121, filed Sep. 7, 2011.
U.S. Appl. No. 61/573,156, filed Sep. 16, 2011.
U.S. Appl. No. 61/573,175, filed Sep. 19, 2011.
U.S. Appl. No. 61/573,176, filed Sep. 19, 2011.
U.S. Appl. No. 61/573,196, filed Sep. 25, 2011.
U.S. Appl. No. 61/627,202, filed Oct. 7, 2011.
U.S. Appl. No. 61/687,436, filed Apr. 25, 2012.
U.S. Appl. No. 61/689,907, filed Apr. 25, 2012.
U.S. Appl. No. 61/796,795, filed Nov. 20, 2012.
U.S. Appl. No. 61/850,856, filed Feb. 25, 2013.
Amendment and Reply for U.S. Appl. No. 12/571,262, dated Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Cameron, A., The Application of Holograhpic Optical Waveguide Technology to Q-Sight Family of Helmet Mounted Displays, Proc. of SPIE, vol. 7326, 73260H-1, 2009, 11 pages.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Extended European Search Report for EP Application No. 13192383, dated Apr. 2, 2014, 7 pages.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 dated May 28, 2014, 16 pages.
Nordin, G., et al., Journal of the Optical Society of America A., vol. 9, No. 12, Dec. 1992, pp. 2206-2217, 12 pages.
Office Action for U.S. Appl. No. 12/571,262, dated Sep. 28, 2011, 5 pages.
Office Action for U.S. Appl. No. 13/250,621, dated May 21, 2013, 10 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Office Action for U.S. Appl. No. 13/355,360, dated Sep. 12, 2013, 7 pages.

(56) References Cited

OTHER PUBLICATIONS

Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Wisely, P.L., Head up and head mounted display performance improvements through advanced techniques in the manipulation of light, Proc. of SPIE vol. 7327, 732706-1, 2009, 10 pages.
Final Office Action on U.S. Appl. No. 13/892,026 dated Nov. 20, 2015, 25 pages.
Final Office Action on U.S. Appl. No. 13/892,057 dated Nov. 20, 2015, 30 pages.
Final Office Action on U.S. Appl. No. 14/152,756, dated Dec. 21, 2015, 15 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
Non-Final Office Action on U.S. Appl. No. 14/465,763, dated Nov. 19, 2015, 4 pages.
Notice of Allowance for U.S. Appl. No. 14/109,551, dated Nov. 20, 2015, 8 pages.
Notice of Allowance on U.S. Appl. No. 13/432,662, dated Feb. 18, 2016, 10 pages.
Notice of Allowance on U.S. Appl. No. 14/225,062, dated Dec. 2, 2015, 10 pages.
Ayras et al., Exit Pupil Expander with a Large Field of View Based on Diffractive Optics, Journal of the SID, 2009, 6 pages.
Crawford, "Switchable Bragg Gratings", Optics & Photonics News, Apr. 2003, pp. 54-59.
Final Office Action in U.S. Appl. No. 13/864,991, dated Apr. 2, 2015, 16 pages.
Final Office Action on U.S. Appl. No. 13/250,858 dated Feb. 4, 2015, 18 pages.
Final Office Action on U.S. Appl. No. 13/250,940 dated Oct. 17, 2014, 15 pages.
Final Office Action on U.S. Appl. No. 13/892,026 dated Apr. 3, 2015, 17 pages.
Final Office Action on U.S. Appl. No. 13/892,057 dated Mar. 5, 2015, 21 pages.
Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/250,858 dated Jun. 12, 2015, 20 pages.
Non-Final Office Action on U.S. Appl. No. 13/250,858 dated Sep. 15, 2014, 16 pages.
Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456 dated Apr. 1, 2015, XX Pages.
Non-Final Office Action on U.S. Appl. No. 13/864,991 dated Oct. 22, 2014, 16 pages.
Non-Final Office Action on U.S. Appl. No. 14/038,400 dated Feb. 5, 2015, 18 pages.
Non-Final Office Action on U.S. Appl. No. 14/044,676 dated Apr. 9, 2015, 13 pages.
Non-Final Office Action on U.S. Appl. No. 14/225,062 dated May 21, 2015, 11 pages.
Notice of Allowance for U.S. Appl. No. 12/700,557, dated Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,858 dated Feb. 19, 2014, 13 page.
Office Action for U.S. Appl. No. 13/250,858, dated Oct. 28, 2013, 9 pages.
Office Action for U.S. Appl. No. 13/250,940, dated Aug. 28, 2013, 10 pages.
Office Action on U.S. Appl. No. 13/250,940 dated Mar. 25, 2014, 12 pages.
Office Action on U.S. Appl. No. 13/251,087 dated Mar. 28, 2014, 12 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Plastic has replaced glass in photochromic lens, www.plastemart.com, 2003, 1 page.
Webster's Third New International Dictionary 433 (1986), 3 pages.
Extended European Search Report for European Application No. 13765610.4 dated Feb. 16, 2016, 6 pages.
Final Office Action on U.S. Appl. No. 14/168,173, dated Nov. 4, 2015, 10 pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 13/250,858, dated Mar. 18, 2016, 20 pages.
U.S. Appl. No. 13/250,858, filed Sep. 30, 2011, Brown et al.
U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/715,332, filed May 18, 2015, Brown et al.
U.S. Appl. No. 14/814,020, filed Jul. 30, 2015, Brown et al.
Extract of US 2010/0296163 (Saarikko), Figure 2 as marked up by Examiner in Final Office Action for U.S. Appl. No. 14/044,676 dated Oct. 20, 2015, 1 page.
Final Office Action on U.S. Appl. No. 14/044,676, dated Oct. 20, 2015, 18 pages.
Final Office Action on U.S. Appl. No. 13/250,858, dated Oct. 7, 2015, 20 pages.
Final Office Action on U.S. Appl. No. 13/432,662, dated Oct. 29, 2015, 9 pages.
Non-Final Office Action on U.S. Appl. No. 14/152,756, dated Aug. 25, 2015, 39 pages.
Notice of Allowance on U.S. Appl. No. 14/038,400, dated Oct. 30, 2015, 9 pages.
Second office action received in Chinese patent application No. 201380001530.1, dated Oct. 12, 2015, 5 pages with English translation.
Final Office Action on U.S. Appl. No. 13/250,858, dated Jul. 11, 2016, 21 pages.
Final Office Action on U.S. Appl. No. 14/044,676, dated Aug. 12, 2016, 23 pages.
Non-Final Office Action on U.S. Appl. No. 13/844,456, dated Aug. 16, 2016, 18 pages.
Non-Final Office Action on U.S. Appl. No. 14/465,763, dated Sep. 29, 2016, 4 pages.

(56) References Cited

OTHER PUBLICATIONS

Non-Final Office Action on U.S. Appl. No. 14/820,237, dated Aug. 5, 2016, 14 pages.
Notice of Allowance on U.S. Appl. No. 14/814,020, dated Aug. 12, 2016, 15 pages.
Non-final Office Action on U.S. Appl. No. 13/250,858, dated Nov. 14, 2016, 18 pages.
Notice of Reasons for Rejection for Japanese Application No. 2015-509120, dated Nov. 1, 2016, 4 pages.
Chinese First Office Action for Chinese Patent Application No. 201610512319.1 dated Aug. 11, 2017. 16 pages.
European Office Action for European Patent Application No. 13192383.1 dated Oct. 16, 2017. 5 pages.
Final Office Action for U.S. Appl. No. 15/136,841 dated Oct. 27, 2017. 15 pages.
Non-Final Office Action for U.S. Appl. No. 14/715,332 dated Dec. 26, 2017. 8 pages.
Notice of Allowance for U.S. Appl. No. 14/044,676 dated Nov. 24, 2017. 18 pages.
Second Office Action for Chinese Patent Application No. 201310557623.4 dated Dec. 1, 2017. 21 pages.
Chinese Office Action issued in corresponding application No. 201310557623, dated Jan. 17, 2017, 13 pages.
Non-Final Office Action on U.S. Appl. No. 13/844,456, dated Dec. 29, 2016, 24 pages.
Non-Final Office Action on U.S. Appl. No. 14/044,676, dated Dec. 29, 2016, 26 pages.
Non-Final Office Action on U.S. Appl. No. 14/715,332, dated Mar. 9, 2017, 14 pages.
Notice of Allowance on U.S. Appl. No. 14/820,237, dated Jan. 23, 2017, 10 pages.
Final Notice of Reasons for Rejection on Japanese Application No. JP2015-509120, dated Mar. 7, 2017, English Translation, 2 pages.
First Office Action on EPO Application No. 13765610.4, dated Apr. 18, 2017, 4 pages.
Final Office Action on U.S. Appl. No. 14/152,756, dated Jun. 7, 2017, 16 pages.
Final Office Action on U.S. Appl. No. 14/715,332, dated Aug. 11, 2017, 14 pages.
First Office Action on Japanese Application No. 2013-231450, dated Aug. 8, 2017, 5 pages.
Non-Final Office Action on U.S. Appl. No. 14/754,368, dated May 8, 2017, 12 pages.
Non-Final Office Action on U.S. Appl. No. 15/178,521, dated Aug. 24, 2017, 10 pages.
Final Office Action on U.S. Appl. No. 14/152,756, dated Oct. 12, 2016, 18 pages.
Final Office Action on U.S. Appl. No. 13/844,456, 19 pages (dated Jul. 10, 2017).
Final Office Action on U.S. Appl. No. 14/044,676, 29 pages (dated Jul. 13, 2017).
Non-Final Office Action on U.S. Appl. No. 14/152,756, dated Feb. 21, 2017, 18 pages.
Non-Final Office Action on U.S. Appl. No. 15/005,507, dated Nov. 22, 2016, 7 pages.
Non-Final Office Action on U.S. Appl. No. 15/136,841, 12 pages (dated Jul. 13, 2017).
Notice of Allowance on U.S. Appl. No. 13/864,991, dated Feb. 2, 2017, 10 pages.
Notice of Allowance on U.S. Appl. No. 13/892,057, dated Nov. 8, 2016, 10 pages.
Corrected Notice of Allowance for U.S. Appl. No. 14/044,676 dated Feb. 1, 2018. 2 pages.
Corrected Notice of Allowance for U.S. Appl. No. 14/044,676 dated Jan. 3, 2018. 2 pages.
International Search Report and Written Opinion for PCT/US18/12227. dated Mar. 14, 2018. 9 pages.
Non-Final Office Action for U.S. Appl. No. 14/152,756 dated Feb. 13, 2018. 17 pages.
Non-Final Office Action for U.S. Appl. No. 15/136,841 dated Mar. 12, 2018. 12 pages.
Notice of Allowance for U.S. Appl. No. 15/005,507 dated May 23, 2017. 8 pages.
Notice of Allowance for U.S. Appl. No. 15/178,521 dated Jan. 31, 2018. 9 pages.
Final Office Action for U.S. Appl. No. 13/844,456 dated Apr. 19, 2018. 24 pages.
Final Office Action for U.S. Appl. No. 14/152,756 dated Aug. 30, 2018.
Final Office Action for U.S. Appl. No. 15/136,841 dated Aug. 31, 2018. 7 pages.
Non-Final Office Action for U.S. Appl. No. 13/844,456 dated Aug. 30, 2018. 17 pages.
Non-Final Office Action for U.S. Appl. No. 15/429,569 dated Sep. 17, 2018. 9 pages.
Supplemental Notice of Allowability on U.S. Appl. No. 13/892,026, dated Nov. 1, 2016, 2 pages.
Decision of Rejection for Japanese Patent Application No. 2013-231450 dated May 8, 2018. 4 pages.
Final Office Action for U.S. Appl. No. 14/465,763 dated Jun. 28, 2018. 4 pages.
Non-Final Office Action for U.S. Appl. No. 15/048,954 dated Jul. 26, 2018. 24 pages.
Notice of Allowance for U.S. Appl. No. 14/715,332 dated May 14, 2018. 9 pages.
Notice of Allowance for U.S. Appl. No. 15/439,597 dated Jun. 15, 2018. 11 pages.
Second Office Action for Chinese Patent Application No. 201610512319.1 dated May 2, 2018. 9 pages.
Third Office Action for Chinese Patent Application No. 20130557623.4 dated May 22, 2018. 16 pages.
Corrected Notice of Allowance for U.S. Appl. No. 15/439,597 dated Oct. 19, 2018. 2 pages.
Final Office Action for U.S. Appl. No. 13/844,456 dated Dec. 17, 2018. 20 pages.
Final Office Action for U.S. Appl. No. 14/465,763 dated Nov. 16, 2018. 6 pages.
Final Office Action for U.S. Appl. No. 15/048,954 dated Jan. 2, 2019. 26 pages.
Final Office Action for U.S. Appl. No. 15/460,076 dated Dec. 3, 2018. 13 pages.
Notice of Allowance for U.S. Appl. No. 15/136,841 dated Nov. 9, 2018. 9 pages.
Third Office Action [With English translation] for CN Application No. 2016105123191 dated Nov. 1, 2018. 16 pages.
Corrected Notice of Allowance for U.S. Appl. No. 15/136,841 dated Feb. 1, 2019. 2 pages.
Fourth Office Action for Chinese Patent Application No. 2016105123191 dated Apr. 25, 2019. 5 pages.
Non-Final Office Action for U.S. Appl. No. 15/048,954 dated Jul. 9, 2019. 22 pages.
Notice of Allowance for U.S. Appl. No. 14/465,763 dated Jun. 4, 2019. 8 pages.
Final Office Action for U.S. Appl. No. 13/844,456 dated Aug. 16, 2019. 28 pages.
Japanese Office Action for JP Patent Application No. 2018-164677 dated Sep. 17, 2019. 4 pages.
Non-Final Office Action for U.S. Appl. No. 13/844,456, dated Feb. 20, 2020, 21 pages.
Non-Final Office Action for U.S. Appl. No. 16/126,618 dated Dec. 19, 2019. 9 pages.
Non-Final Office Action for U.S. Appl. No. 16/384,435 dated Aug. 7, 2019. 8 pages.
Notice of Allowance for U.S. Appl. No. 15/048,954 dated Apr. 3, 2020 (2 pages).
Notice of Allowance for U.S. Appl. No. 16/020,125 dated Mar. 27, 2020 (2 pages).
Notice of Allowance for U.S. Appl. No. 16/020,125, dated Feb. 25, 2020, 10 pages.
Notice of Allowance for U.S. Appl. No. 16/126,618 dated Apr. 7, 2020 (7 pages).

(56) References Cited

OTHER PUBLICATIONS

Notice of Allowance for U.S. Appl. No. 16/384,435, dated Feb. 26, 2020, 7 pages.
Notice of Allowance for U.S. Appl. No. 14/465,763 dated Nov. 15, 2019. 4 pages.
Notice of Allowance for U.S. Appl. No. 15/048,954 dated Jan. 6, 2020. 10 pages.
Preliminary Report on Patentability for PCT Application No. PCT/US2018/012227 dated Aug. 8, 2019. 7 pages.
Final Office Action on JP 2018-164677 dated May 19, 2020 (5 pages).
Final Office Action on U.S. Appl. No. 13/844,456 dated Jun. 5, 2020 (23 pages).

\* cited by examiner

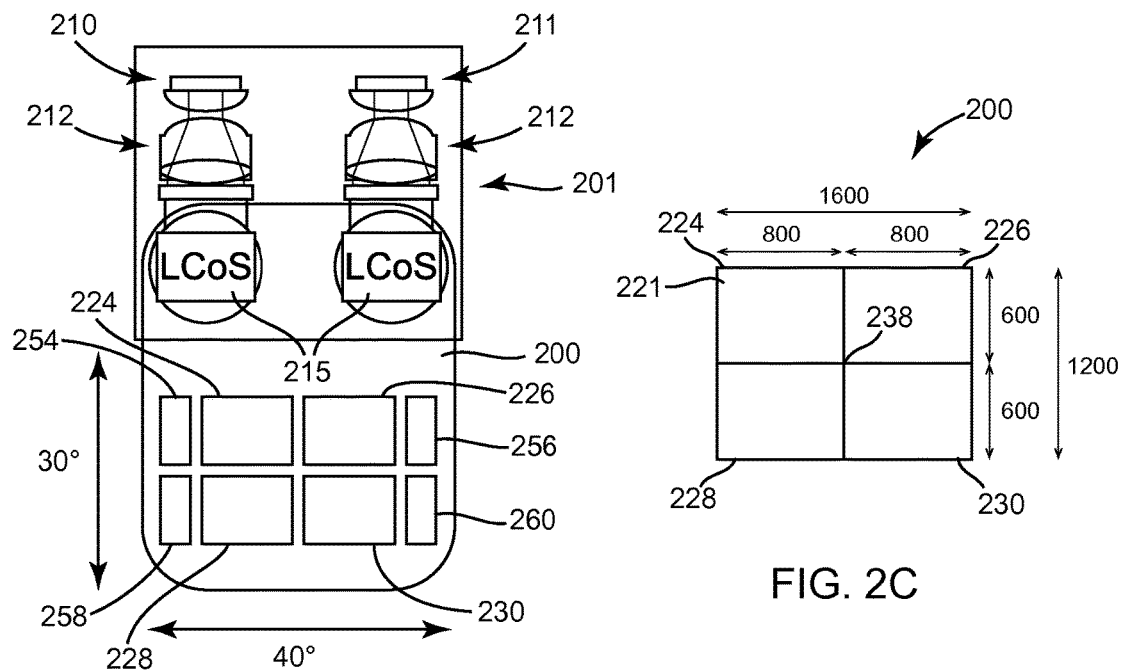
FIG. 2A
FIG. 2C
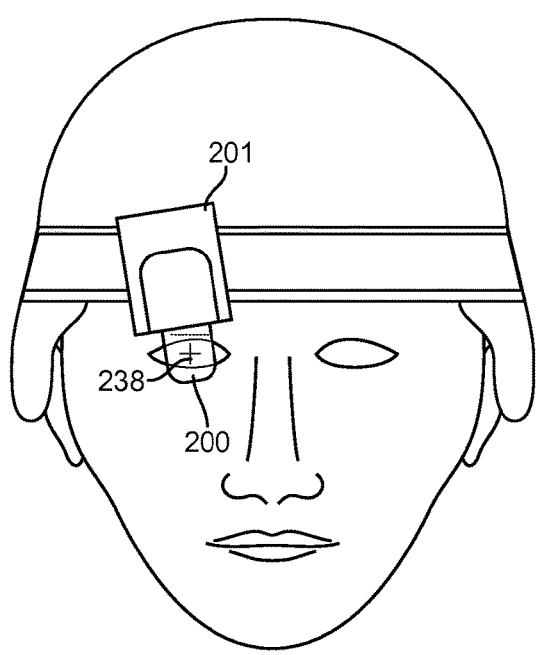
FIG. 2B
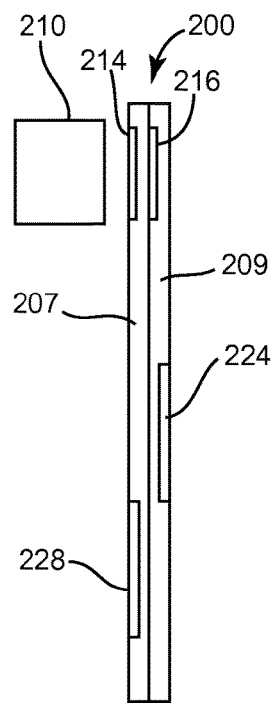
FIG. 2D

SYSTEMS FOR AND METHODS OF USING FOLD GRATINGS FOR DUAL AXIS EXPANSION

CROSS-REFERENCE TO RELATED PATENT APPLICATIONS

The present application is related to U.S. patent application Ser. No. 14/465,763 (09KE459CC (047141-1029)) filed on Aug. 21, 2014, by Robbins et al., entitled "OPTICAL DISPLAYS," which claims the benefit of and priority to and is a Continuation of U.S. patent application Ser. No. 13/355,360, filed on Jan. 20, 2012 (now U.S. Pat. No. 8,817,350, issued on Aug. 26, 2014) (09KE459C (047141-0834)), which claims the benefit of and priority to and is a Continuation of U.S. patent application Ser. No. 12/571,262 filed on Sep. 30, 2009 (now U.S. Pat. No. 8,233,204, issued on Jul. 31, 2012) (09KE459 (047141-0689)); U.S. patent application Ser. No. 13/869,866 (13FD325 (047141-0920)) filed on Apr. 24, 2013, by Popovich et al., entitled "HOLOGRAPHIC WIDE ANGLE DISPLAY," which claims the benefit of and priority to U.S. Provisional Patent Application No. 61/687,436 filed on Apr. 25, 2012, and U.S. Provisional Patent Application No. 61/689,907 filed on Jun. 15, 2012; and U.S. patent application Ser. No. 13/844,456 (13FD235 (047141-0903)) filed on Mar. 15, 2013, by Brown et al., entitled "TRANSPARENT WAVEGUIDE DISPLAY PROVIDING UPPER AND LOWER FIELDS OF VIEW," which claims the benefit of and priority to U.S. Provisional Patent Application No. 61/796,632 filed on Nov. 16, 2012, and U.S. Provisional Patent Application No. 61/849,853 filed on Feb. 4, 2013, all of which are assigned to the assignee of the present application and incorporated herein by reference.

BACKGROUND

The present disclosure relates to displays including but not limited to near eye displays. More specifically, the disclosure relates to substrate guided optics.

Substrate guided displays have been proposed which use waveguide technology with diffraction gratings to preserve eye box size while reducing lens size. U.S. Pat. No. 4,309,070 issued to St. Leger Searle and U.S. Pat. No. 4,711,512 issued to Upatnieks disclose substrate waveguide head up displays where the pupil of a collimating optical system is effectively expanded by the waveguide structure. U.S. patent application Ser. No. 13/869,866 discloses holographic wide angle displays and U.S. patent application Ser. No. 13/844,456 discloses waveguide displays having an upper and lower field of view.

SUMMARY

One exemplary embodiment of the disclosure relates to a near eye optical display. The near eye optical display includes a waveguide comprising a first surface and a second surface, an input coupler, a fold grating, and an output grating. The input coupler is configured to receive collimated light from a display source and to cause the light to travel within the waveguide via total internal reflection between the first surface and the second surface to the fold grating. The fold grating is configured to provide pupil expansion in a first direction and to direct the light to the output grating via total internal reflection between the first surface and the second surface. The output grating is configured to provide pupil expansion in a second direction different than the first direction and to cause the light to exit the waveguide from the first surface or the second surface.

Another exemplary embodiment of the disclosure relates to a method of displaying information. The method includes receiving collimated light in a waveguide having a first surface and a second surface; providing the collimated light to a fold grating via total internal reflection between the first surface and the second surface; providing pupil expansion in a first direction using the fold grating and directing the light to an output grating via total internal reflection between the first surface and the second surface; and providing pupil expansion in a second direction different than the first direction and causing the light to exit the waveguide from the first surface or the second surface.

Another exemplary embodiment of the disclosure relates to an apparatus for providing an optical display. The apparatus for providing an optical display includes a first image source for a first image for a first field of view, and a second image source for a second image for a second field of view, and a waveguide. The waveguide includes a first surface, a second surface, a first input coupler, a second input coupler, a first fold grating, a second fold grating, a first output grating, and a second output grating. The first input coupler is configured to receive the first image and to cause the first image to travel within the waveguide by total internal reflection between the first surface and the second surface to the first fold grating. The first fold grating is configured to provide pupil expansion in a first direction and to direct the first image to the first output grating via total internal reflection between the first surface and the second surface. The first output grating is configured to provide pupil expansion in a second direction different than the first direction and to cause the first image to exit the waveguide from the first surface or the second surface. The second input coupler is configured to receive the second image and to cause the second image to travel within the waveguide by total internal reflection between the first surface and the second surface to the second fold grating. The second fold grating is configured to provide pupil expansion in the first direction and to direct the second image to the second output grating via total internal reflection between the first surface and the second surface. The second output grating is configured to provide pupil expansion in the second direction different than the first direction and to cause the second image to exit the waveguide from the first surface or the second surface.

BRIEF DESCRIPTION OF THE DRAWINGS

The invention will become more fully understood from the following detailed description, taken in conjunction with the accompanying drawings, wherein like reference numerals refer to like elements, in which:

FIG. 2A is a planar top view schematic drawing of a dual axis expansion waveguide display system according to another exemplary embodiment;

FIG. 2B is a front view schematic illustration of the dual axis expansion waveguide display system illustrated in FIG. 2A according to another exemplary embodiment;

FIG. 2C is a top view schematic drawing of four output gratings forming a composite image by tiling four output images for the dual axis expansion waveguide display system illustrated in FIG. 2A according to another exemplary embodiment;

FIG. 2D is a side view schematic drawing of the dual axis expansion waveguide display system illustrated in FIG. 2A according to another exemplary embodiment;

DETAILED DESCRIPTION

Figure 1A:
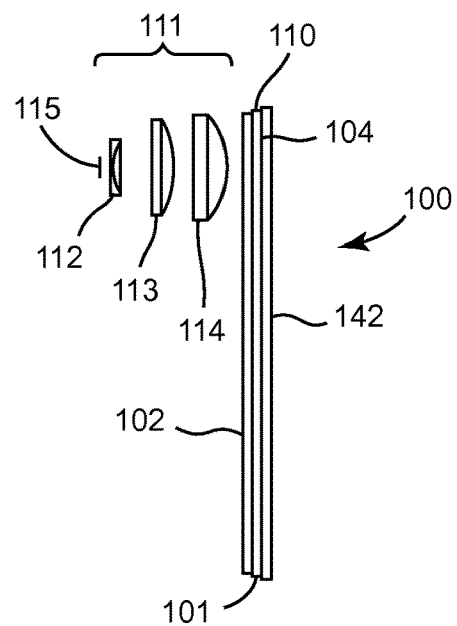
FIG. 1A is a planar side view schematic drawing of a dual axis expansion waveguide display system according to an exemplary embodiment.

Following below are more detailed descriptions of various concepts related to, and embodiments of, an inventive optical display and methods for displaying information. It should be implemented in any of numerous ways, as the disclosed concepts are not limited to any particular manner of implementation. Examples of specific implementations and applications are provided primarily for illustrative purposes.

The invention will now be further described by way of example with reference to the accompanying drawings. It will be apparent to those skilled in the art that the present invention may be practiced with some or all of the present invention as disclosed in the following description. For the purposes of explaining the invention, well-known features of optical technology known to those skilled in the art of optical design and visual displays have been omitted or simplified in order not to obscure the basic principles of the invention. Unless otherwise stated, the term "on-axis" in relation to a ray or a beam direction refers to propagation parallel to an axis normal to the surfaces of the optical components described in relation to the invention. In the following description, the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description of the invention, repeated usage of the phrase "in one embodiment" does not necessarily refer to the same embodiment.

Referring generally to the Figures, systems and methods relating to near-eye display or head up display systems are shown according to various embodiments. Holographic waveguide technology can be advantageously utilized in waveguides for helmet mounted displays or head mounted displays (HMDs) and head up displays (HUDs) for many applications, including military applications and consumer applications (e.g., augmented reality glasses, etc.). Switchable Bragg gratings (SBGs), which are holograms recorded in holographic polymer dispersed liquid crystal, may be used in waveguides to create a larger field of view with increased resolution in current display systems, including HMDs, HUDs, and other near eye displays. SBGs may also be used to increase the field of view by tiling images presented sequentially on a micro display. A larger exit pupil may be created by using fold gratings in conjunction with conventional or other gratings to provide pupil expansion on a single waveguide in both the horizontal and vertical directions, thereby enabling the use of a very small lens system. Using the systems and methods disclosed herein, a single optical waveguide substrate may generate a wider field of view than found in current waveguide systems. Diffraction gratings may be used to split and diffract light rays into several beams that travel in different directions, thereby dispersing the light rays.

Figure 1B:
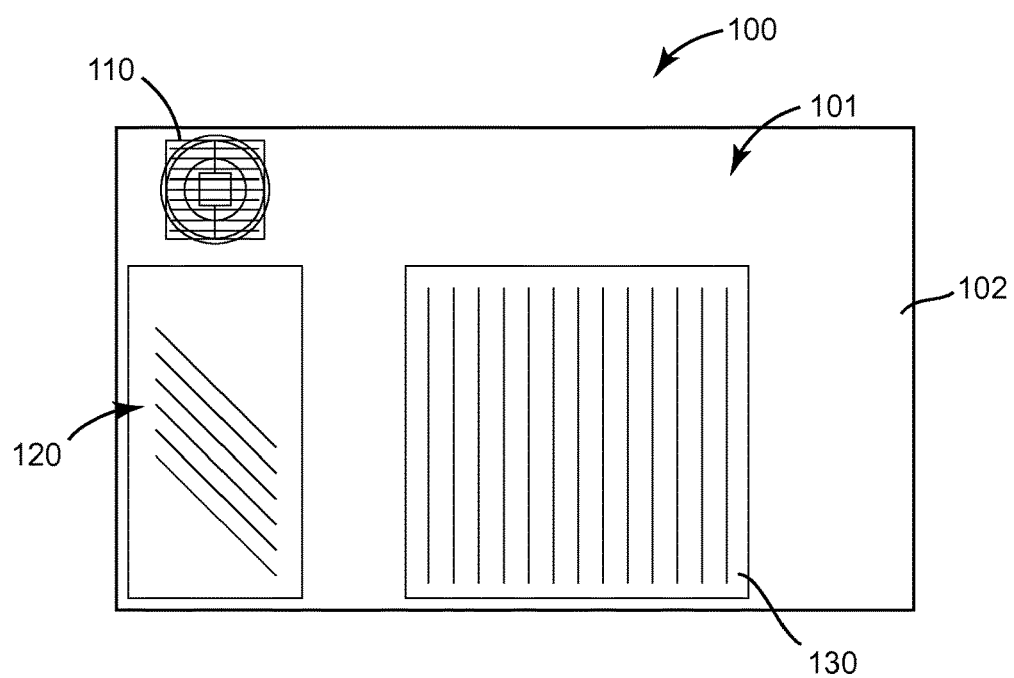
FIG. 1B is a planar top view schematic drawing of the dual axis expansion waveguide display system illustrated in FIG. 1A according to an exemplary embodiment.

Referring to FIG. 1, an illustration of a dual axis (e.g., vertical and horizontal) beam expansion waveguide display system 100 is shown according to an exemplary embodiment. FIG. 1A is a planar side view schematic drawing of a dual axis expansion waveguide display system according to an exemplary embodiment. FIG. 1B is a planar top view schematic drawing of the dual axis expansion waveguide display system illustrated in FIG. 1A according to an exemplary embodiment. The waveguide display system 100 includes a substrate waveguide 101 and a light source 111. In some embodiments, the light from the light source III is polarized.

Substrate waveguide 101 includes a first surface 102, a second surface 104, an input coupler 110, a fold grating 120, and an output grating 130. The first and second surfaces 102 and 104 define the boundaries of the waveguide substrate 101 containing the fold grating 120 and the output grating 130 and are flat, planar surfaces in some embodiments. In some embodiments, waveguide substrate 101 can be a transmissive material, such as glass or plastic suitable for optical designs. The waveguide substrate 101 can be comprised of one or more layers and coatings.

Input coupler 110 can be a prism, mirror, reflective surface or grating for injecting light from the light source 111 into the waveguide substrate 101. In some embodiments, the input coupler 110 can be a holographic grating, such as a switchable or non-switchable SBG grating. Similarly, and in some embodiments, the fold grating 120 and the output grating 130 can be holographic gratings, such as switchable or non-switchable SBGs. As used herein, the term grating may encompass a grating comprised of a set of gratings in some embodiments.

The waveguide substrate 101 may include a number of layers. For example, in some embodiments, a first layer includes the fold grating 120 while a second layer includes the output grating 130. In some embodiments, a third layer can include input coupler 110. The number of layers may then be laminated together into a single waveguide substrate 101.

In some embodiments, the waveguide substrate 101 is comprised of a number of pieces including the input coupler 110, the fold grating 120 and the output grating 130 (or portions thereof) that are laminated together to form a single substrate waveguide. The pieces may be separated by optical glue or other transparent material of refractive index matching that of the pieces.

In another embodiment, the input coupler 110, the fold grating 120 and the output grating 130 can each be recorded into the same substrate to form the waveguide substrate 101. In another embodiment, the waveguide substrate 101 may be formed via a cell making process by creating cells of the desired grating thickness and vacuum filling each cell with SBG material for each of the input coupler 110, the fold grating 120 and the output grating 130. In one embodiment, the cell is formed by positioning multiple plates of glass with gaps between the plates of glass that define the desired grating thickness for the input coupler 110, the fold grating 120 and the output grating 130. In one embodiment, one cell may be made with multiple apertures such that the separate apertures are filled with different pockets of SBG material. Any intervening spaces may then be separated by a separating material (e.g., glue, oil, etc.) to define separate areas within a single substrate waveguide 101. In one embodiment, the SBG material may be spin-coated onto a substrate and then covered by a second substrate after curing of the material.

By using the fold grating 120, the waveguide display system 100 advantageously requires fewer layers than previous systems and methods of displaying information according to some embodiments. In addition, by using fold grating 120, light can travel by total internal refection within the substrate waveguide 101 in a single rectangular prism defined by surfaces 102 and 104 while achieving dual pupil expansion.

In another embodiment, the input coupler 110, the fold grating 120 and the output grating 130 can be created by interfering two waves of light at an angle within the substrate to create a holographic wave front, thereby creating light and dark fringes that are set in the waveguide substrate 101 at a desired angle. In one embodiment, the input coupler 110, the fold grating 120, and the output grating 130 embodied as holograms can be Bragg gratings recorded in a holographic polymer dispersed liquid crystal (HPDLC) (e.g., a matrix of liquid crystal droplets), although Bragg gratings may also be recorded in other materials. Bragg gratings recorded in HPDLC are known as SBGs. In one embodiment, SBGs are recorded in a special HPDLC material, such as POLICRYPS, resulting in a matrix of pure liquid crystal Bragg planes separated by solid polymer. SBGs may also be recorded in other materials, including POLIPHEM. Similar to POLICRYPS, POLIPHEM also provides a matrix of pure liquid crystal Bragg planes separated by solid polymer, however both substances are fabricated by different processes. The SBGs can be switching or non-switching in nature. In its non-switching form, an SBG has the advantage over conventional holographic photopolymer materials of being capable of providing high refractive index modulation due to its liquid crystal component.

The light source 111 can include a number of input objective lenses 112, 113, 114 and an image source 115 and can provide collimated light to the input coupler 110. The image source 115 can be a micro-display or laser based display. In one or more embodiments, the image source is a liquid crystal display (LCD) micro display or liquid crystal on silicon (LCOS) micro display.

In some embodiments, the input objective lenses 112, 113, 114 may be many different types of lenses, including, for example, projection lenses. In some embodiments, however, the light source 111 includes a single input objective lens (e.g., input objective lens 112). The input coupler 110 is configured to receive collimated light from a display source and to cause the light to travel within the substrate waveguide 101 via total internal reflection between the first surface 102 and the second surface 104 to the fold grating 120. The input objective lenses 112, 113, 114 collimate the display image on the image source 115 and each pixel on the image source 115 is converted into a unique angular direction within the substrate waveguide 101 according to some embodiments. The input coupler 110 may be orientated directly towards or at an angle relative to the fold grating 120. For example, in one embodiment, the input coupler 110 may be set at a slight incline in relation to the fold grating 120. One advantage of tilting the input coupler 110 is that the waveguide substrate 101 may also be tilted with respect to the viewer. For example, such tilting may allow the visor of FIG. 3B to provide a peripheral vision rather than a flat faceplate. Another benefit of using dual axis expansion in an optical waveguide is that smaller input objective lenses 112, 113, 114 may be used according to some embodiments. In some embodiments, at least one of the input objective lenses 112, 113, 114 may be a diffractive lens.

In some embodiments, the fold grating 120 may be oriented in a diagonal direction. The fold grating 120 is configured to provide pupil expansion in a first direction and to direct the light to the output grating 130 via total internal reflection between the first surface 102 and the second surface 104 of the substrate waveguide 101 in some embodiments. In one embodiment, a longitudinal edge of each fold grating 120 is oblique to the axis of alignment of the input coupler 110 such that each fold grating 120 is set on a diagonal with respect to the direction of propagation of the display light. The fold grating 120 is angled such that light from the input coupler 110 is redirected to the output grating 130. In one example, the fold grating 120 is set at a forty-five degree angle (e.g., 40-50 degrees) relative to the direction that the display image is released from the input coupler 110. This feature causes the display image propagating down the fold grating 120 to be turned into the output grating 130. For example, in one embodiment, the fold grating 120 causes the image to be turned 90 degrees into the output grating 130. In this manner, a single waveguide provides dual axis pupil expansion in both the horizontal and vertical directions. In one embodiment, each of the fold grating 120 may have a partially diffractive structure. In some embodiments, each of the fold grating 120 may have a fully diffractive structure. In some embodiments, different grating configurations and technologies may be incorporated in a single substrate waveguide 101.

The output grating 130 is configured to provide pupil expansion in a second direction different than the first direction and to cause the light to exit the waveguide 100 from the first surface or the second surface. The output grating 130 receives the display image from the fold grating 120 via total internal reflection and provides pupil expansion in a second direction. In some embodiments, the output grating 130 may consist of multiple layers of substrate, thereby comprising multiple layers of output gratings. Accordingly, there is no requirement for gratings to be in one plane within the substrate waveguide 101, and gratings may be stacked on top of each other (e.g., cells of gratings stacked on top of each other). The output grating 130 can be disposed approximately perpendicular to the gratings of the input couple 110 in some embodiments. In some embodiments, the output grating is disposed approximately 5-10 degrees (e.g., approximately 7.5 degrees) from the vertical axis.

In some embodiments, a quarter wave plate 142 on the substrate waveguide 101 rotates polarization of a light ray to maintain efficient coupling with the SBGs. The quarter wave plate 142 may be coupled to or adhered to the surface 102 of substrate waveguide 101. For example, in one embodiment, the quarter wave plate 142 is a coating that is applied to substrate waveguide 101. The quarter wave plate 142 provides light wave polarization management. Such polarization management may help light rays retain alignment with the intended viewing axis by compensating for skew waves in the substrate waveguide 101. In one embodiment, the output grating 130 may be contained by glass. The quarter wave plate 142 is optional and can increase the efficiency of the optical design in some embodiments. In some embodiments, the substrate waveguide 101 does not include the quarter wave plate 142. The quarter wave plate may be provided as a multi-layer coating.

Referring to FIGS. 2A-C, illustrations of a medium field of view head mounted display system 201 are shown according to an exemplary embodiment. FIG. 2A is a planar top view schematic drawing of one embodiment of a head mounted display system 201 including a dual axis (e.g., vertical and horizontal) beam expansion waveguide 200 and light sources 210 and 211. FIG. 2B is front view schematic illustration of an embodiment of the head mounted display system 201 being worn on a helmet, and FIG. 2C is a top view schematic drawing of four output gratings forming a composite image by tiling four output images for the head mounted display system 201 according to one embodiment. In one embodiment, the resolution of the composite image is formed by the tiling of four 800 by 600 images to create a composite 1600 by 1200 image in field of view space. The micro display input image may be updated synchronously with the switching of the SBGs. In some embodiments, the head mounted display system 201 provides a 30 degree by 40 degree field of view at the output grid 221 using multiplexing techniques such as those described in the applications incorporated herein by reference.

The light sources 210 and 211 may each include a number of input objective lenses 212 and image sources 215 that can provide collimated light. The image sources 215 can be micro displays or laser based displays, among other display types. In one or more embodiments, the image sources 215 are liquid crystal display (LCD) micro displays or liquid crystal on silicon (LCOS) micro displays. In one alternative embodiment, light sources 210 and 211 can be a single light source having two images for substrate waveguide 200.

In some embodiments, the input objective lenses 212 may be many different types of lenses, including, for example, projection lenses. In some embodiments, however, the light sources 210 and 211 include a single input objective lens. Pairs of input couplers on substrate waveguide 200, similar to input coupler 110, are each configured to receive collimated light from respective display sources 210 and 211 and to cause the light to travel within the substrate waveguide 200 via total internal reflection to respective fold gratings 254, 256, 258, and 260 similar to fold grating 120. The pairs of input couplers include a first pair of input couplers 214 and 216 associated with light source 210 (FIG. 2D). A second pair similar to the first pair is provided on substrate waveguide 201. The light from each respective fold grating 254, 256, 258, and 260 travels within the substrate waveguide 200 via total internal reflection to a respective output grating 224, 226, 228, and 230 similar to output grating 130 to form a respective image. FIG. 2A depicts output grating 224, 226, 228, and 230 as non-overlapping, however, it will be appreciated that the output gratings 224, 226, 228, and 230 overlap each other in some embodiments. FIG. 2A also depicts fold gratings 254, 258 as non-overlapping and fold gratings 256, 260 as non-overlapping, however, it will be appreciated that the fold gratings 254, 258, 256, and 260 may overlap in some embodiments. For example, in one embodiment, fold grating 254 and fold grating 258 overlap each other.

As shown in FIG. 2A, the substrate waveguide 200 may include the same or similar elements of the substrate waveguide 101 shown and described in relation to FIG. 1A, including fold gratings 254, 256, 258, and 260, and output gratings 224, 226, 228, and 230. In some embodiments, the head mounted display system 201 includes the light source 210 and the light source 211. Additional light sources can be utilized in some embodiments. As explained in further detail below, a light source 210 causes an image to travel from image source 215 to an input grating 214 or 216, which causes the image to travel within the substrate waveguide 200 via total internal reflection to one of fold gratings 254 or 258, which in turn causes the image to travel within the substrate waveguide 200 via total internal reflection to output grating 224 or 228, respectively. Multiplexing techniques are used such that an image is displayed by one output grating and then the other output grating to form half of a composite image. The multiplexing techniques can be used to turn gratings 214 and 216 on and off in a sequential fashion. Likewise, image source 211 causes an image to travel from image source 215 to a pair of input gratings similar to gratings 214 and 216, which then causes the image to travel within the substrate waveguide 200 via total internal reflection to one of fold gratings 256 or 260, which in turn causes the image to travel within the substrate waveguide 200 via total internal reflection to output grating 226 or 230, respectively. Multiplexing techniques are used such that an image is displayed by one output grating and then the other out grating to form half of a composite image. Together, the two half composite images form a full composite image. The gratings may be switchable and can be turned on and off, thereby deflecting light or not deflecting light, to effect multiplexing operations.

Referring to FIG. 2C, a top view schematic drawing of four output gratings forming a composite image by tiling four output images for the dual axis expansion waveguide display system illustrated in FIG. 2A is shown according to an exemplary embodiment. In some embodiments, output grid 221 includes four or more output gratings 224, 226, 228, and 230, each similar to output grating 130 and each corresponding to an output image that forms a composite image. In some embodiments, the output gratings 224, 226, 228, and 230 are switchable and can be turned on and off, thereby deflecting light or not deflecting light, to effect multiplexing operations. The output gratings 224, 226, 228, and 230 eject the light from the substrate waveguide 201 to the user. In some embodiments, the output grating 224 receives light from light source 210 via fold grating 254, output grating 228 receives light from light source 210 via fold grating 258, output grating 226 receives light from light source 211 via fold grating 256, and output grating 230 receives light from light source 211 via fold grating 260. In some embodiments, each output grating forms an image 20 by 15. Accordingly, each of light sources 210 and 211 forms an image 20 by 30. When the images formed by each light source are combined, a 40 by 30 composite image is formed. In the embodiment illustrated by FIG. 2C, each output grating 224, 226, 228, and 230 forms an image that is 800 pixels by 600 pixels, and when combined form a composite image that is 1600 pixels by 1200 pixels, however it will be appreciated that different configurations are possible. Although output grid 221 is shown as a 2 by 2 grid in a dual waveguide structure, other arrangements are possible. For example, a 3 by 2 grid can be provided on a waveguide structure including three layers or substrates. A 3 by 3 grid can be achieved using a waveguide structure including three layers or substrates and three fold gratings, three input gratings, and three output gratings per layer or substrate and three light sources, and so on. By including the light source 210 and the light source 211, the substrate waveguide 200 may create a full field of view or larger field of view. The composite image may also include an origin 238 positioned in front of a pupil of an eye of a user.

Referring to FIG. 2D, a side view schematic drawing of the dual axis expansion waveguide display system 201 illustrated in FIG. 2A is shown according to another exemplary embodiment. As shown in FIG. 2D, only half the dual axis expansion waveguide display system 201 illustrated in FIG. 2A is shown. In one embodiment, the substrate waveguide 200 may include multiple layers, such as first layer 207 and second layer 209, however it will be appreciated that additional layers, or even a single layer, may be used. In one embodiment, fold grating 228 and output grating 258 are located in the same plane within first layer 207, and therefore overlap in FIG. 2D. Similarly, fold grating 254 and output grating 224 are located in the same plane within second layer 209 and therefore overlap in FIG. 2D. The light source 210 causes an image to travel from the image source 215 to input grating 214, which causes the image to travel within the substrate waveguide 200 via total internal reflection to fold grating 254 (FIG. 2A), which in turn cause the image to travel within the substrate waveguide 200 within first layer 207 via total internal reflection to output grating 228. Likewise, the light source 210 causes an image to travel from the image source 215 to input grating 216, which causes the image to travel within the substrate waveguide 200 within second layer 209 via total internal reflection to fold gratings 224 (FIG. 2A), which in turn cause the image to travel within the substrate waveguide 200 within second layer 209 via total internal reflection to output grating 224. The images from light source 211 are provided to fold gratings 256 and 260 and output gratings 226 and 230 in a similar fashion as described above with respect to light source 210. Multiplexing techniques are used such that an image is displayed by one output grating and then the other output grating to form half of a composite image. Together, the two half composite images form a full composite image. The gratings may be switchable and can be turned on and off, thereby deflecting light or not deflecting light, to effect multiplexing operations.

Figure 3A:
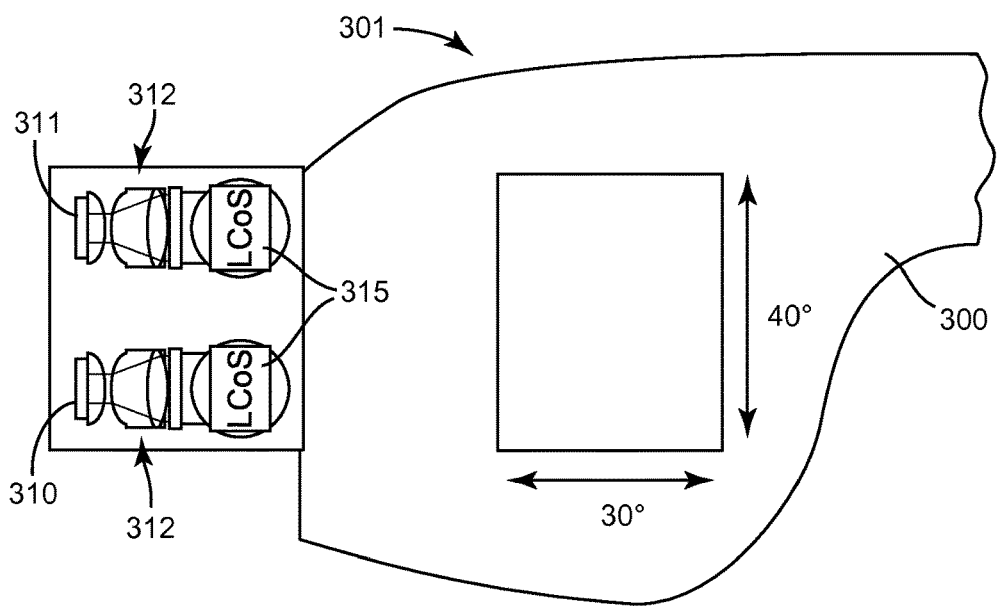
FIG. 3A is a planar top view schematic drawing of a dual axis expansion waveguide display system according to another exemplary embodiment.
Figure 3B:
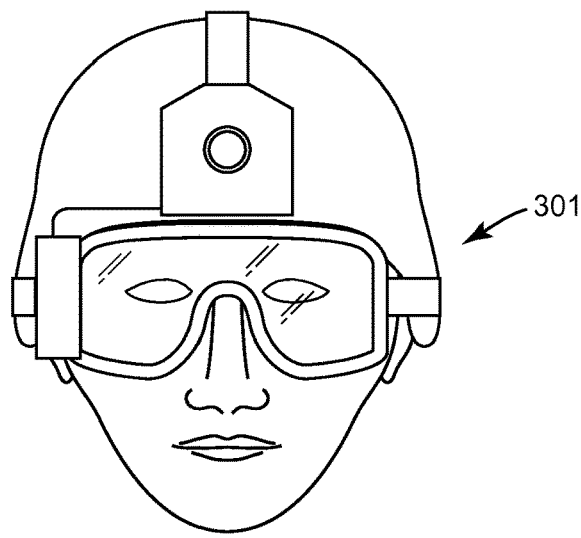
FIG. 3B is a front view schematic illustration of the dual axis expansion waveguide display system illustrated in FIG. 3A according to another exemplary embodiment.
Figure 3C:
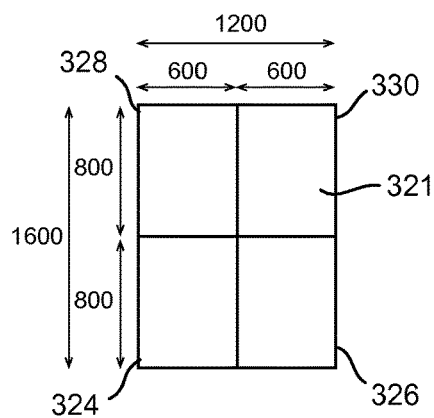
FIG. 3C is a top view schematic drawing of four output gratings forming a composite image by tiling four output images for the dual axis expansion waveguide display system illustrated in FIG. 3A according to another exemplary embodiment.

Referring to FIGS. 3A-C, illustrations of a medium field of view goggle display system 301 is shown according to an exemplary embodiment. FIG. 3A is a planar top view schematic drawing of one embodiment of the goggle display system 301 including a dual axis (e.g., vertical and horizontal) beam expansion waveguide 300 and light sources 310 and 311. FIG. 3B is a front view schematic illustration of an embodiment of the goggle display system 301 being worn on a helmet, and FIG. 3C is a planar top view schematic drawing of an output grid 321 for the goggle display system 301, according to one embodiment. In some embodiments, the goggle display system 301 provides a 40 degree by 30 degree field of view at the output grid 321 using multiplexing techniques such as those described in the applications incorporated herein by reference.

As shown in FIG. 3A, the substrate waveguide 300 may include the same or similar elements of the substrate waveguide 200 shown and described in relation to FIGS. 2A-C. In some embodiments, the goggle display system 301 includes the light source 310 and the light source 311. Additional light sources can be utilized in some embodiments.

The light sources 310 and 311 may each include a number of input objective lenses 312 and image sources 315 that can provide collimated light. The image sources 315 can be micro displays or laser based displays, among other display types. In one or more embodiments, the image sources 315 are liquid crystal display (LCD) micro displays or liquid crystal on silicon (LCOS) micro displays. In one alternative embodiment, light sources 310 and 311 can be a single light source having two images for substrate waveguide 300.

In some embodiments, the input objective lenses 312 may be many different types of lenses, including, for example, projection lenses. In some embodiments, however, the light sources 310 and 311 include a single input objective lens. A pair of input couplers on substrate waveguide 300, similar to input coupler 110, are each configured to receive collimated light from respective display sources 310 and 311 and to cause the light to travel within the substrate waveguide 300 via total internal reflection to a respective fold grating similar to fold grating 120. The light from each respective fold grating travels within the substrate waveguide 300 via total internal reflection to output grid 321.

In some embodiments, output grid 321 includes four or more output gratings 324, 326, 328, and 330, each similar to output grating 130. In some embodiments, the output gratings 324, 326, 328, and 330 are switchable and can be turned on and off to effect multiplexing operations. The output gratings 324, 326, 328, and 330 eject the light from the substrate waveguide 300 to the user. In some embodiments, the output gratings 324 and 326 receive light from the first fold grating in substrate waveguide 300 and light source 310, and the output gratings 328 and 330 receive light from the second fold grating in substrate waveguide 300 and light source 311.

By including the light source 310 and the light source 311, the substrate waveguide 300 may create a full field of view or larger field of view. In some embodiments, the substrate waveguide 300 creates a full field of view or larger field of view using multiplexing techniques. For example, FIG. 3C illustrates an embodiment similar to that of FIG. 2C, except that the composite images are displayed in a horizontal orientation. In some embodiments, each output grating forms an image 15 by 20. Accordingly, each of light sources 310 and 311 forms an image 30 by 20. When the images formed by each light source are combined, a 30 by 40 composite image is formed. In the embodiment illustrated by FIG. 3C, each output grating 324, 326, 328, and 330 forms an image that is 600 pixels by 800 pixels, and when combined form a composite image that is 1200 pixels by 1600 pixels, however it will be appreciated that different configurations are possible. Although output grid 321 is shown as a 2 by 2 grid in a dual waveguide structure, other arrangements are possible. For example, a 3 by 2 grid can be provided on a waveguide structure including three layers or substrates. A 3 by 3 grid can be achieved using a waveguide structure including three layers or substrates and three fold gratings, three input gratings, and three output gratings per layer or substrate and three light sources, and so on. By including the light source 310 and the light source 311, the substrate waveguide 300 may create a full field of view or larger field of view. The composite image may also include an origin positioned in front of a pupil of an eye of a user.

In some embodiments, this configuration is utilized in a head mounted display goggle as shown in FIG. 3B, for example, a sand wind and dust goggle. In some embodiments, the output waveguide SBGs are displaced so that they line up with the eye location in the goggle. In some embodiments, an origin of grid 321 is positioned in front of a pupil of the eye of the user.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure.

What is claimed is:

1. A near eye optical display, comprising:
   a waveguide comprising a first surface and a second surface, an input coupler, a first fold grating, and a first output grating, wherein the input coupler is configured to receive collimated light from a first display source and to cause the light to travel within the waveguide via total internal reflection between the first surface and the second surface to the first fold grating, the first fold grating disposed on a diagonal with respect to a direction of propagation of the light received by the first fold grating, and wherein the first fold grating is configured to provide pupil expansion in a first direction and to direct the light to the first output grating via total internal reflection between the first surface and the second surface, and wherein the first output grating is configured to provide pupil expansion in a second direction different than the first direction and to cause the light to exit the waveguide from the first surface or the second surface, wherein the light associated with the first fold grating and the first output grating exits the waveguide to form a first image tile, wherein light associated with a second fold grating and a second output grating exits the waveguide to form a second image tile, wherein the first image tile and the second image tile are equal-sized image tiles that form a first part of a single composite image, wherein a second part of the single composite image is formed by two additional equal-sized image tiles provided by a second display source, one of the additional equal-size image tiles being expanded by a third fold grating corresponding with a third output grating, the other additional equal-sized image tile being expanded by a fourth fold grating corresponding with a fourth output grating, and wherein a perceivable display size of the single composite image is greater than a perceivable display size of any one of the first image tile, the second image tile, the two additional equal-sized image tiles, the first part of the single composite image, and the second part of the single composite image.

2. The display of claim 1, wherein the first direction is orthogonal to the second direction.

3. The display of claim 1, wherein the first surface and the second surface are planar surfaces, wherein the waveguide comprises a plurality of layers, and wherein a first layer of the plurality of layers comprises the input coupler, a second layer of the plurality of layers comprises the fold grating, and a third layer of the plurality of layers comprises the output grating.

4. The display of claim 1, further comprising:
   a collimating lens system for providing light from the first display source to the input coupler.

5. The display of claim 1, further comprising:
   a quarter wave plate on the first surface or the second surface of the waveguide.

6. The display of claim 1, wherein the input coupler, the fold grating, and the output grating are liquid crystal-based gratings, and wherein the input coupler comprises a first switchable Bragg grating, the fold grating comprises a second switchable Bragg grating, and the output grating comprises a non-switchable Bragg grating.

7. The display of claim 1, wherein the fold grating comprises one or more of Bragg gratings or gratings recorded in holographic polymer dispersed liquid crystal.

8. The display of claim 1, wherein the first direction is horizontal and the second direction is vertical.

9. The display of claim 1, wherein the display provides a field of view of at least 20 by 15 degrees.

10. The display of claim 1, wherein the first direction is vertical and the second direction is horizontal.

11. A method of displaying information, the method comprising:
    receiving, from a first display source, collimated light in a waveguide having a first surface and a second surface;
    providing the collimated light to a first fold grating via total internal reflection between the first surface and the second surface, the first fold grating disposed on a diagonal with respect to a direction of propagation of the light received by the first fold grating;
    providing pupil expansion in a first direction using the first fold grating and directing the light to a first output grating via total internal reflection between the first surface and the second surface; and
    providing pupil expansion in a second direction different than the first direction and causing the light to exit the waveguide from the first surface or the second surface;
    wherein the light associated with the first fold grating and the first output grating exits the waveguide to form a first image tile, wherein light associated with a second fold grating and a second output grating exits the waveguide to form a second image tile, wherein the first image tile and the second image tile are equal-sized image tiles forming a first part of a single composite image, wherein a second part of the single composite image is formed by two additional equal-sized image tiles provided by a second display source, one of the additional equal-size image tiles being expanded by a third fold grating corresponding with a third output grating, the other additional equal-sized image tile being expanded by a fourth fold grating corresponding with a fourth output grating; and wherein a perceivable display size of the single composite image is greater than a perceivable display size of any one of the first image tile, the second image tile, the two additional equal-sized image tiles, the first part of the single composite image, and the second part of the single composite image.

12. The method of claim 11, wherein the first surface and the second surface are planar.

13. The method of claim 11, wherein the fold grating and the output grating are switchable or non-switchable Bragg gratings.

14. The method of claim 13, wherein the input coupler is a switchable or non-switchable Bragg grating.

15. The method of claim 13, wherein the fold grating is a first set of gratings and the output grating is a second set of gratings.

16. An apparatus for providing an optical display, comprising:
a first image source for a first image for a first field of view;
a second image source for a second image for a second field of view;
a waveguide comprising a first surface, a second surface, a first input coupler, a second input coupler, a first fold grating, a second fold grating, a first output grating, and a second output grating, wherein the first input coupler is configured to receive the first image and to cause the first image to travel within the waveguide by total internal reflection between the first surface and the second surface to the first fold grating, the first fold grating disposed on a diagonal with respect to a direction of propagation of the light received by the first fold grating, wherein the first fold grating is configured to provide pupil expansion in a first direction and to direct the first image to the first output grating via total internal reflection between the first surface and the second surface, wherein the first output grating is configured to provide pupil expansion in a second direction different than the first direction and to cause the first image to exit the waveguide from the first surface or the second surface, wherein the second input coupler is configured to receive the second image and to cause the second image to travel within the waveguide by total internal reflection between the first surface and the second surface to the second fold grating, the second fold grating disposed on the diagonal, wherein the second fold grating is configured to provide pupil expansion in the first direction and to direct the second image to the second output grating via total internal reflection between the first surface and the second surface, and wherein the second output grating is configured to provide pupil expansion in the second direction different than the first direction and to cause the second image to exit the waveguide from the first surface or the second surface;

wherein the first image and the second image are a first image tile and a second image tile, respectively, of at least four equal-sized image tiles forming a single composite image, a third image tile of the single composite image is provided by the first image source and is expanded by a third fold grating corresponding with a third output grating, and a fourth image tile of the single composite image is provided by the second display source and is expanded by a fourth fold grating corresponding with a fourth output grating; and wherein a perceivable display size of the single composite image is greater than a perceivable display size of any one of the first image tile, the second image tile, the third image tile, and the fourth image tile.

17. The apparatus of claim 16, wherein the first direction is orthogonal to the second direction.

18. The apparatus of claim 16, wherein the first field of view is at least 15 by 20 degrees.

19. The apparatus of claim 16, wherein the third output grating receiving a third image from the first fold grating, and the fourth output grating receiving a fourth image from the second fold grating, the first and third images being provided by the first image source sequentially and the second and fourth images being provided by the second image source sequentially.

20. The apparatus of claim 19, wherein the first and third output gratings are switched sequentially to appropriately output the first image and the third image from the waveguide.

* * * * *